(12) United States Patent
Liu

(10) Patent No.: US 8,590,799 B2
(45) Date of Patent: Nov. 26, 2013

(54) SYSTEMS, METHODS, APPARATUS OF A SECURE RFID RECORD

(76) Inventor: Jun Liu, Vienna, VA (US)

(*) Notice: Subject to any disclaimer, the term of this patent is extended or adjusted under 35 U.S.C. 154(b) by 0 days.

(21) Appl. No.: 13/098,475

(22) Filed: May 1, 2011

(65) Prior Publication Data

US 2011/0266343 A1    Nov. 3, 2011

Related U.S. Application Data

(60) Provisional application No. 61/329,564, filed on Apr. 30, 2010.

(51) Int. Cl.
*G06K 19/06* (2006.01)
(52) U.S. Cl.
USPC .......................................................... 235/494
(58) Field of Classification Search
USPC ................................................ 235/492, 494
See application file for complete search history.

(56) References Cited

U.S. PATENT DOCUMENTS

| | | | | |
|---|---|---|---|---|
| 2006/0230661 A1* | 10/2006 | Bekker | ............................ | 40/633 |
| 2006/0244603 A1* | 11/2006 | Kline | .......................... | 340/572.7 |
| 2007/0011870 A1* | 1/2007 | Lerch et al. | ...................... | 29/832 |
| 2008/0117022 A1* | 5/2008 | Polozola | ...................... | 340/10.1 |
| 2008/0290176 A1* | 11/2008 | Fleet | .............................. | 235/492 |

* cited by examiner

*Primary Examiner* — Christle Marshall
(74) *Attorney, Agent, or Firm* — Syncoda LLC; Larry Lian

(57) ABSTRACT

Systems, methods and apparatus of a secure RFID record are described herein. In one aspect, an apparatus of a RFID wristband comprises three layers: the top layer is a wristband, the middle layer is one RFID tag comprising one RFID chip and one tag antenna covering the wide area of the wristband, the bottom layer is made by anti-irritation materials. In another aspect, an apparatus of a RFID wristband comprises three layers: the top layer is a wristband, the middle layer has two RFID tags, each of which comprises one RFID chip and one tag antenna; the bottom layer is made by anti-irritation materials. In another aspect, a RFID system for secure communication comprises: a tag with at least two memory areas for storing an unique identifier and encoded data, respectively; a reader with at least three functions: key search, decoding process and encoding process; the unique identifier is associated with a key while the key is stored on the reader or a server connected to the reader.

8 Claims, 4 Drawing Sheets

SYSTEMS, METHODS, APPARATUS OF A SECURE RFID RECORD

RELATED APPLICATIONS INFORMATION

The application claims the benefit under 35 U.S.C. 119(e) of U.S. Provisional Patent Application Ser. No. 61/329,564, filed Apr. 30, 2010 and entitled "Systems, Methods and Apparatus of a Secure RFID Record," which is incorporated herein by reference in its entirety.

BACKGROUND

Barcode wristbands have been used in hospitals for identifying patients when a barcode wristband is worn on the wrist of a patient. Since reading a barcode requires line of sight, medical staff has to contact the patient hand in order to read the barcode. This not only presents inconvenience but also increases the contacts between medical staff and the patient. These direct contacts between medical staff and a patient should be avoided as much as possible, especially in contagious medical cases. In addition, barcode is a read-only media. Once a barcode is printed or affixed on a wristband, the content which it represents can not be changed or appended.

RFID is a possible solution to overcome the difficulties described above. In theory, reading a RFID tag does not require line of sight. When a RFID wristband (a wristband with a RFID tag affixed) is worn around a patient wrist, the wrist may be in between the tag and the reader; in these circumstances, the reader will not be able to read the tag or not reliably because the wrist is mainly made up by liquid (blood) and absorbs most of RF energy from the reader. In addition, secure access to data on RFID is needed.

There is a need to read/write a RFID wristband from all angle, and a need to read from and write into data on RFID securely such as a RFID wristband.

SUMMARY

Systems, methods and apparatus of a secure RFID record are described herein.

In one aspect, an apparatus of a RFID wristband comprises three layers: the top layer is a wristband, the middle layer is one RFID tag comprising one RFID chip and one tag antenna covering the wide area of the wristband, the bottom layer is made by anti-irritation materials.

In another aspect, an apparatus of a RFID wristband comprises three layers: the top layer is a wristband, the middle layer has two RFID tags, each of which comprises one RFID chip and one tag antenna; the bottom layer is made by anti-irritation materials.

In another aspect, a RFID system for secure communication comprises: a tag with at least two memory areas for storing an unique identifier and encoded data, respectively; a reader with at least three functions: key search, decoding process and encoding process; the unique identifier is associated with a key while the key is stored on the reader or a server connected to the reader.

BRIEF DESCRIPTION OF THE DRAWINGS

Features, aspects, and embodiments are described in conjunction with the attached drawings, in which.

DETAILED DESCRIPTION

Wristbands have been used by various business operations to identify their served clients. For example, hospitals use wristbands to identify patients; hotels, resorts and theme parks use them to identify guests.

1) All-Angle Readable/Writable RFID Wristband

Figure 1:
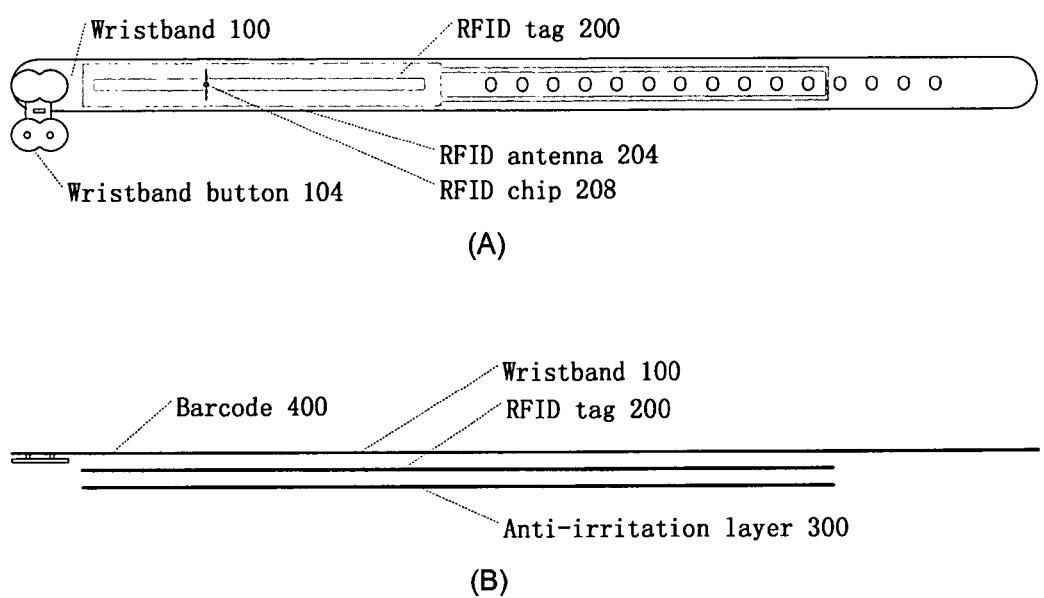
FIG. 1 is a diagram illustrating a RFID wristband configured in accordance with one example embodiment.
Figure 2:
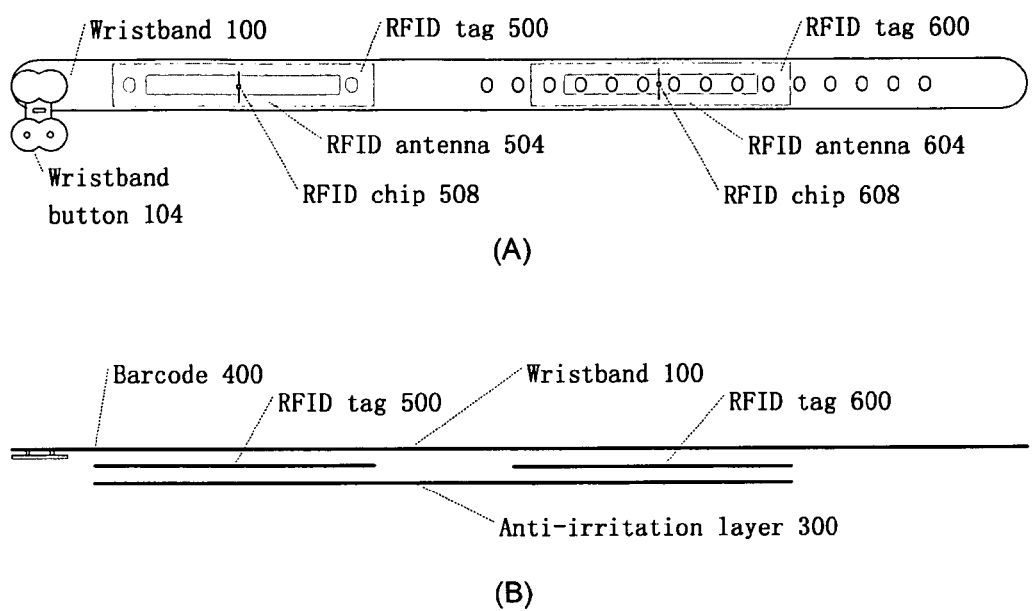
FIG. 2 is a diagram illustrating a RFID wristband configured in accordance with another example embodiment.

As described in the background section, there exists a need to design an all-angle readable/writable RFID wristband. One method is to use one RFID tag by extending its antenna to cover the wide area of the wristband so that the antenna is functioning as much as possible no matter how a patient wears the wristband around his/her wrist. For this method, an example implementation is shown in FIG. 1. Another method is to use two RFID tags so that at least one tag is not blocked by the patient wrist; an example implementation is shown in FIG. 2. In general, the two tag method has a better performance in terms of reading angle coverage and reading distance, comparing with the one tag method, though its cost is higher.

The bottom view of a RFID wristband by the one tag method is shown FIG. 1 (A). At one end of the Wristband 100, there is a Wristband Button 104; at the other end, there are a number of small punched circles, one of which will be clapped with the Wristband Button 104 when the Wristband 100 is worn around a patient wrist. A RFID tag 200 is placed on the wristband, which consists of a RFID Antenna 204 and a RFID Chip 208. The RFID Antenna 204 has a slotted antenna type in this example but other antenna types may be used. The RFID Chip 208 may be a RFID strap. A RFID strap is a miniature of a RFID tag.

The side view of the RFID wristband by the one tag method is shown FIG. 1 (B). It consists of three layers: Wristband 100, RFID Tag 200 and anti-irritation layer 300. The spacing between layers is for illustration purpose and not in scale. The RFID Tag 200 is below the Wristband 100; and the anti-irritation layer 300 covers the RFID Tag 200. The anti-irritation layer is to protect the patient skin from irritation. The layer 300 is also water-proof and with high dielectricity. Optionally, Barcode 400 may be printed on the wristband surface for additional or auxiliary identification purposes.

The bottom view of a RFID wristband by the two tag method is shown FIG. 2 (A). At one end of the Wristband 100, there is a Wristband Button 104; at the other end, there are a number of small punched circles, one of which will be clapped with the Wristband Button 104 when the Wristband 100 is worn around a patient wrist. Two RFID tags are placed on the wristband: the RFID tag 500 is located near the side of the Wristband Button 104 while the RFID tag 600 is located on the side of small punched circles. The RFID tag 500 consists of a RFID Antenna 504 and a RFID Chip 508. The RFID tag 600 consists of a RFID Antenna 604 and a RFID Chip 608. The RFID Antennas 504 and 604 has a slotted antenna type in this example but other antenna types may be used. The RFID Chip 508 or 608 may be a RFID strap. A RFID strap is a miniature of a RFID tag.

The side view of the RFID wristband by the two tag method is shown FIG. 2 (B). It consists of three layers: Wristband 100, RFID Tags 500 and 600 and anti-irritation layer 300. The spacing between layers is for illustration purpose and not in scale. The RFID Tags 500 and 600 are below the Wristband 100; and the anti-irritation layer 300 covers the RFID Tags 500 and 600. The anti-irritation layer 300 is to protect the patient skin from irritation. The layer 300 is also water-proof and with high dielectricity. Optionally, Barcode 400 may be printed on the wristband surface for additional or auxiliary identification purposes.

2) Secure Access on Data in Tag

Figure 3:
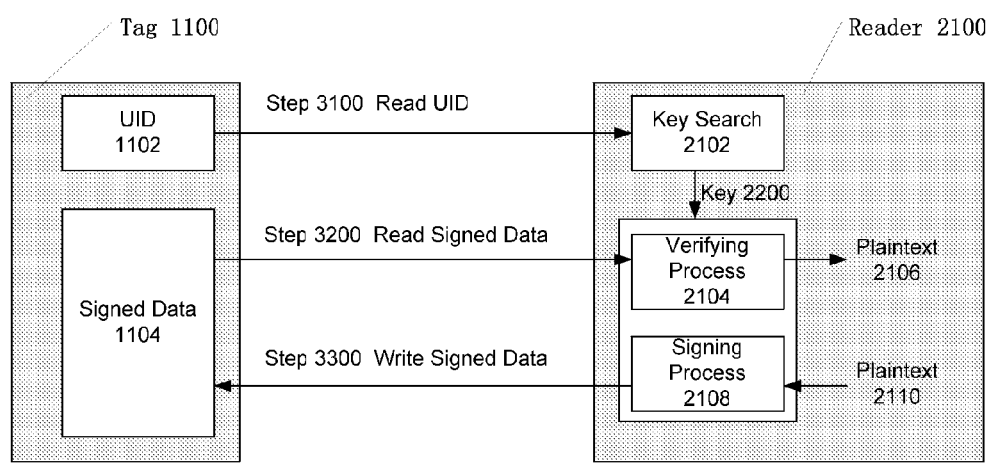
FIG. 3 is a diagram illustrating a secure RFID system configured in accordance with one example embodiment.
Figure 4:
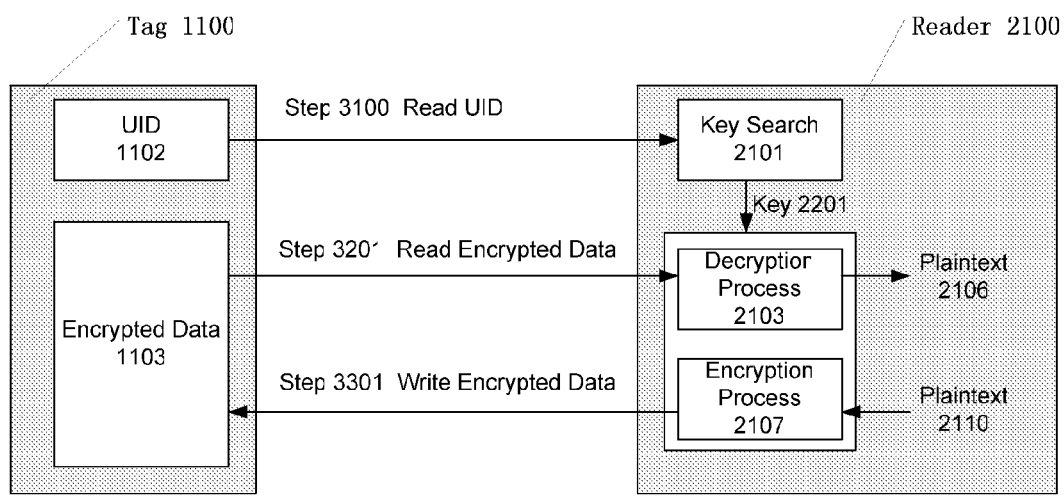
FIG. 4 is a diagram illustrating a secure RFID system configured in accordance with another example embodiment.

In this invention, encoded data, rather than raw data, is stored in tag. Each tag has a unique identifier. The key to decode data in tag is stored on the reader only (or the server securely connected to the reader). This key is associated with the unique identifier of each tag, and never transmitted over the air. In this secure access scheme, an un-authorized reader will not be able to comprehend the content of data in tag, nor have the key to do so. Two example implementations of the secure access scheme are shown in FIGS. 3 and 4, respectively. Although the steps in FIGS. 3 and 4 are in an order that is most logical, the steps in FIGS. 3 and 4 may be combined or the order changed. Furthermore, the secure access methods herein apply to any RFID application, not limited to RFID wristband applications described in 1).

As shown in FIG. 3, Tag 1100 consists of at least two memory areas: UID 1102 and Signed Data 1104. UID 1102 is a unique identifier for Tag 1100. For a tag compliant to ISO 18000-6C, UID 1102 may be the Tag ID or the EPC code. The data stored in Tag 1100 is Signed Data 1104 rather than raw data (plaintext), and an un-authorized reader can not comprehend the content of Signed Data 1104. Reader 2100 consists of at least Key Search 2102, Verifying Process 2104 and Signing Process 2108. Each UID 1102 is associated with a key; however, the key is stored on the reader 2100 (or the server securely connected to the reader 2100), and this key is never transmitted over the air. After reading the UID (Step 3100), Reader 2100 performs Key Search 2102 to retrieve Key 2200 associated with UID 1102. The retrieved key 2200 is used in Verifying Process 2104 and Signing Process 2108. After reading Signed Data (Step 3200), Reader 2100 performs Verifying Process 2104 to render Plaintext 2106. If writing into Tag 1100 (Step 3300) is required, Reader 2100 performs Signing Process 2108 on the data (Plaintext 2110) to render Signed Data, and then writes Signed Data into Tag 1100.

As shown in FIG. 4, Tag 1100 consists of at least two memory areas: UID 1102 and Encrypted Data 1103. UID 1102 is a unique identifier for Tag 1100. For a tag compliant to ISO 18000-6C, UID 1102 may be the Tag ID or the EPC code. The data stored in Tag 1100 is Encrypted Data 1103 rather than raw data (plaintext), and an un-authorized reader can not comprehend the content of Encrypted Data 1103. Reader 2100 consists of at least Key Search 2101, Decryption Process 2103 and Encryption Process 2107. Each UID 1102 is associated with a key; however, the key is stored on the reader 2100 (or the server securely connected to the reader 2100), and this key is never transmitted over the air. After reading the UID (Step 3100), Reader 2100 performs Key Search 2101 to retrieve Key 2201 associated with UID 1102. The retrieved key 2201 is used in Decryption Process 2103 and Encryption Process 2107. After reading Encrypted Data (Step 3201), Reader 2100 performs Encryption Process 2103 to render Plaintext 2106. If writing into Tag 1100 (Step 3301) is required, Reader 2100 performs Encryption Process 2107 on the data (Plaintext 2110) to render Encrypted Data, and then writes Encrypted Data into Tag 1100.

3) Using Both Barcode and RFID

In the case that barcode is printed with a RFID tag, the barcode is designed to contain a key for the tag. In such, key is distributed among tags, not in a server. The key contained in barcode can be used in the secure access scheme described in 2), or any other applicable security scheme.

While certain embodiments have been described above, it will be understood that the embodiments described are by way of example only. Accordingly, the systems, methods and apparatus described herein should not be limited based on the described embodiments. Rather, the systems, methods and apparatus described herein should only be limited in light of the claims that follow when taken in conjunction with the above description and accompanying drawings.

What is claimed is:

1. An apparatus of a RFID wristband, comprising three layers:
    the top layer is a wristband;
    the middle layer has two RFID tags, each of which comprises one RFID chip and one tag antenna, and each of which operates independently, wherein the two RFID tags are placed so that at least one of the two RFID tags is not blocked by the wrist when the wristband is worn by a subject and read by a RFID reader, and wherein both RFID tags serve subject-identification purpose;
    the bottom layer is made by anti-irritation materials.

2. The apparatus of claim 1 wherein a wristband button is at one end and a number of small punched circles are at the other end, one of which is clapped with the wristband button when the RFID wristband is worn around a patient wrist.

3. The apparatus of claim 2 wherein one RFID tag is located near the side of the wristband button and the other RFID tag is located on the side of small punched circles.

4. The apparatus of claim 1 wherein each tag antenna is a slotted antenna type.

5. The apparatus of claim 1 wherein each RFID chip is a RFID strap.

6. The apparatus of claim 1 wherein the bottom layer is water-proof and with high dielectricity.

7. The apparatus of claim 1 wherein a barcode is printed on the wristband surface.

8. The apparatus of claim 1, wherein the bottom layer cover the two RFID tags.

* * * * *